W. C. Goodwin,
Fish Hook,
No. 58,404.     Patented Oct. 2, 1866.

Witnesses.
E. W. Baldwin.
R. Fitzgerald.

Inventor.
W. C. Goodwin.

UNITED STATES PATENT OFFICE.

W. C. GOODWIN, OF HAMDEN, CONNECTICUT.

IMPROVEMENT IN FISH-HOOKS.

Specification forming part of Letters Patent No. 58,404, dated October 2, 1866.

*To all whom it may concern:*

Be it known that I, WILLIAM C. GOODWIN, of the town of Hamden, in the county of New Haven and State of Connecticut, have invented a new and useful Improvement in Fish-Hooks; and I do hereby declare that the following is a full, clear, and exact description of the construction, character, and operation of the same, reference being had to the accompanying drawings, which make part of this specification, in which—

Figure 1:
Figure 2:
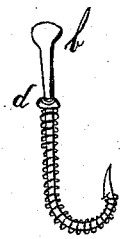

Figure 1 is a perspective view of a fish-hook made with a loop at the end of the shank or stock, to which the line is to be attached, and with a spiral spring on the whole length of the shank and bow extending to the barb. Fig. 2 is a perspective view of a fish-hook made with a flat end to the shank, suited to have the line secured by thread or any other analogous means, and an annular projection or tubercle on the shank for the spiral spring to rest against.

My improvement consists in making the fish-hook in any of the well-known forms, or otherwise, with any form or shape at the end of the shank to sustain the upper end of the spiral spring, or with a projection made on the central part of the shank, against which the upper end of the spiral spring may rest, and so that the lower end of the spring may press against the bait and force it as near as possible to the point of the hook to attract the fish to that part of the hook, so as to insure his getting the point of the hook in his mouth.

I make the fish-hook in the usual way, with a loop at the end of the shank, as shown at *a*, Fig. 1, (to which the line is to be attached,) or with a flattened end like *b*, Fig. 2, making the shank plain for the whole length; or I make an annular swelling or projection on the central part of the shank, as shown at *d*, Fig. 2, in the wire itself, or by binding another wire around it, or by any other analogous means, to form a stop for the upper end of the spring to rest against, as shown in Fig. 2; or, when the line is attached to the hook by means of a thread or small wire, so that the line lies for some distance along or parallel to the shank, the line and its fastening may serve for the rest.

I make the spiral or helical spring in the usual way and form, of the proper size to work freely on the shank of the hook, either for the whole length, as shown in Fig. 1, or for a part only, as shown in Fig. 2.

Having made the two parts as before described, either before or after the line has been attached to the hook I slip or pass a sufficient quantity of the spiral spring over the point and barb or beard of the hook, and then when the bait is put onto the hook the spiral spring will force the bait snugly against the barb, and therefore close to the point of the hook, so that when the fish seizes the bait he is almost certain to get the point of the hook in his mouth also, and so be hooked and caught, and the weight or strength of the fish will readily force back the spring out of the way, so that the weight of the fish will rest in the central part of the bow.

What I claim as my invention, and desire to secure by Letters Patent, is—

The combination of the fish-hook with the spiral or helical spring, when they are constructed, put together, and made fit for use substantially as herein described.

W. C. GOODWIN.

Witnesses:
E. W. BALDWIN,
R. FITZGERALD.